(12) United States Patent
Bhatt

(10) Patent No.: US 8,977,077 B2
(45) Date of Patent: Mar. 10, 2015

(54) TECHNIQUES FOR PRESENTING USER ADJUSTMENTS TO A DIGITAL IMAGE

(71) Applicant: Apple Inc., Cupertino, CA (US)

(72) Inventor: Nikhil M. Bhatt, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 144 days.

(21) Appl. No.: 13/746,222

(22) Filed: Jan. 21, 2013

(65) Prior Publication Data

US 2014/0205207 A1 Jul. 24, 2014

(51) Int. Cl.
*G06K 9/03* (2006.01)
*G06T 5/00* (2006.01)

(52) U.S. Cl.
CPC .................................... *G06T 5/00* (2013.01)
USPC ....................................................... 382/311

(58) Field of Classification Search
None
See application file for complete search history.

(56) References Cited

U.S. PATENT DOCUMENTS

| | | | | |
|---|---|---|---|---|
| 7,391,933 B2 * | 6/2008 | Wang et al. | | 382/300 |
| 7,653,883 B2 * | 1/2010 | Hotelling et al. | | 715/863 |
| 7,881,548 B2 * | 2/2011 | Ono | | 382/254 |
| 8,194,992 B2 * | 6/2012 | Marchesotti | | 382/254 |
| 2004/0001079 A1 * | 1/2004 | Zhao et al. | | 345/719 |
| 2004/0250218 A1 * | 12/2004 | Wecker et al. | | 715/812 |
| 2006/0029294 A1 * | 2/2006 | Akiyoshi et al. | | 382/300 |
| 2010/0105443 A1 * | 4/2010 | Vaisanen | | 455/566 |
| 2010/0138369 A1 * | 6/2010 | Ando et al. | | 706/12 |
| 2010/0289825 A1 * | 11/2010 | Shin et al. | | 345/667 |
| 2010/0302272 A1 * | 12/2010 | Reid et al. | | 345/591 |
| 2011/0221936 A1 * | 9/2011 | Steinberg et al. | | 348/241 |
| 2012/0014600 A1 * | 1/2012 | Nanu et al. | | 382/167 |
| 2013/0002947 A1 * | 1/2013 | Mikhalenkov | | 348/441 |
| 2013/0061180 A1 * | 3/2013 | Dongen et al. | | 715/847 |
| 2013/0114894 A1 * | 5/2013 | Yadav et al. | | 382/167 |

* cited by examiner

*Primary Examiner* — Bhavesh Mehta
*Assistant Examiner* — Feng Niu
(74) *Attorney, Agent, or Firm* — Schwegman Lundberg & Woessner, P.A.

(57) ABSTRACT

Techniques for generating a preview image in an image editing application in response to detecting user input that changes the value of an adjustable parameter of a digital image undergoing adjustment. According to one technique, instead of processing the digital image through a filter chain to generate an updated preview image, a blended image is generated through interpolation of two previously generated versions of the digital image. The previously generated versions may be generated through the filter chain. The blended image may be generated in a shorter amount of time in response to the user's adjustment than the time needed to process the digital image through the filter chain. Thus, the current preview image may be updated with the blended image sooner than is possible if the current preview image is updated by processing the digital image through the filter chain.

28 Claims, 6 Drawing Sheets

TECHNIQUES FOR PRESENTING USER ADJUSTMENTS TO A DIGITAL IMAGE

TECHNICAL FIELD

The present invention relates to generally to digital image processing and, more particularly, to computer-implemented techniques for presenting user adjustments to a digital image.

BACKGROUND

Computer-based digital image editing applications allow a user to adjust a digital image after the image has been captured or created. For example, an image editing application may be used to change the exposure of the image or add highlights or shadows to the image, among other adjustments.

Such image editing applications typically present user interface controls for adjusting the image. Examples of such user interface controls include graphical slider controls and text entry fields, among other controls. The controls are used to change the values of various adjustable parameters of the digital image.

Many of these image editing applications also present a preview image. The preview image is a version of the digital image that has been adjusted based on the current settings of the user interface controls. When the user changes the setting of one of the user interface controls, these image editing applications update the preview image to reflect the settings change. By presenting a preview image that is updated as the user manipulates the user interface controls, the user can experiment with different changes to adjustable parameters and receive visual feedback on how the changes affect the digital image undergoing adjustment.

One possible technique for applying the current settings of the user interfaces controls to the preview image involves the image editing application processing a version of the digital image through an image filter chain (or just filter chain) in response to detecting user input that changes the value of an adjustable parameter. A filter chain is an ordered set of image filters. Each filter accepts as input a digital image and values for one or more adjustable parameters of that filter. Each filter produces a processed digital image as output. Each filter may process its input digital image differently to accomplish different image adjustments. For example, one filter may adjust the color of its input image while another filter may sharpen its input image. The image that is output by a filter in the ordered set may be provided as input to the next filter in the ordered set. Thus, with a filter chain, a combination of multiple image adjustments may be applied to the digital image undergoing adjustment to produce an updated preview image.

Unfortunately, using a filter chain to update the preview image may result in a sub-optimal user experience. In particular, there may be a delay noticeable to the user after the user changes the setting of user interface controls for an adjustable parameter and before the preview image is updated to reflect the change. This noticeable delay may be caused by the time needed to process the digital image undergoing adjustment through the filter chain.

For example, assume that an image editing application has three controls, one for each of brightness, contrast, and exposure. Further assume that the current value of each of these parameters is 50, and that the possible value range is from 0 to 100. If the brightness control is changed from 50 to 55, the preview image is changed to reflect the adjustment by applying the brightness filter (based on the value 55), then the contrast filter (based on the value 50), and then the exposure filter (based on the value 50). Only after all filters in the chain have been applied can the preview image be updated to reflect the change. The overhead associated with applying these three filters in response to the change in one parameter may cause an unacceptable delay between (a) when the parameter value was changed, and (b) when the preview image reflects the change.

Further, as the number of adjustable parameters supported by the image editing application increases, the number of filters in the filter chain may also increase, adding to this delay. As a result of this noticeable time lag, the user may become frustrated with image editing application. Users would appreciate an image editing application capable of updating the preview image in response to user input that changes an adjustable parameter without a noticeable delay or at least with a shorter delay.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Techniques are described herein for reducing lag when updating a preview image in an image editing application in response to detecting user input that changes the value of an adjustable parameter of a digital image. According to one technique, instead of processing a version of the digital image undergoing adjustment through a filter chain to generate an updated preview image in response to detecting the user input, a blended image is generated in response to detecting the user input. Typically, the blended image can be generated in a shorter amount of time in response to the user's adjustment than the time needed to process the digital image undergoing adjustment through the filter chain. Thus, in many cases, the preview image can be updated with the blended image in response to the user's adjustment image sooner than is possible if the preview image is updated by processing a version of the digital image undergoing adjustment through the filter chain.

In some embodiments, the blended image is generated in response to detecting the user input by interpolating pixel values of the blended image from pixel values of two previously generated versions of the digital image. For example, a first previously generated version of the digital image may reflect a first plurality of values of a corresponding plurality of image adjustment parameters. A second previously generated version of the digital image may reflect a second plurality of values of the corresponding plurality of image adjustment parameters. The first plurality of values may be the same as the second plurality of values, except for values that correspond to one particular image adjustment parameter of the plurality of image adjustment parameters. The value, in the first plurality of values, for the particular image adjustment parameter may be different from the value, in the second plurality of values, for the particular image adjustment parameter. In response to detecting that user interface controls associated with the particular image adjustment parameter are changed to a particular setting that corresponds to a value that is between the value, in the first plurality of values, for the particular image adjustment parameter and the value, in the second plurality of values, for the particular image adjustment parameter, the first previously generated version of the digital image and the second previously generated version of the digital image are blended to generate and display a blended version of the digital image as the preview image.

In some embodiments, the two previously generated versions of the digital image are generated through a filter chain in response to detecting user input that indicates that the user is about to change the setting of the user interface controls associated with the particular image adjustment parameter. For example, the two versions may be generated through a filter chain in response to detecting movement of a pointing device cursor towards the user interface controls associated with the particular image adjustment parameter. By doing so, the two versions of the digital image can be generated through the filter chain sufficiently ahead of the time the two version of the digital image are used to generated the blended image in response to detecting user input that actually changes the setting of the user interface controls associated with the particular image adjustment parameter.

Thus, techniques are provided for more quickly generating a preview image in response to detecting user input that adjusts the value of a parameter of a digital image undergoing adjustment, thereby increasing the effectiveness of, the efficiency of, and user satisfaction with image editing applications that implement the techniques. Such techniques may complement or replace existing techniques for generating a preview image in an image editing application.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Introduction

Figure 1A:
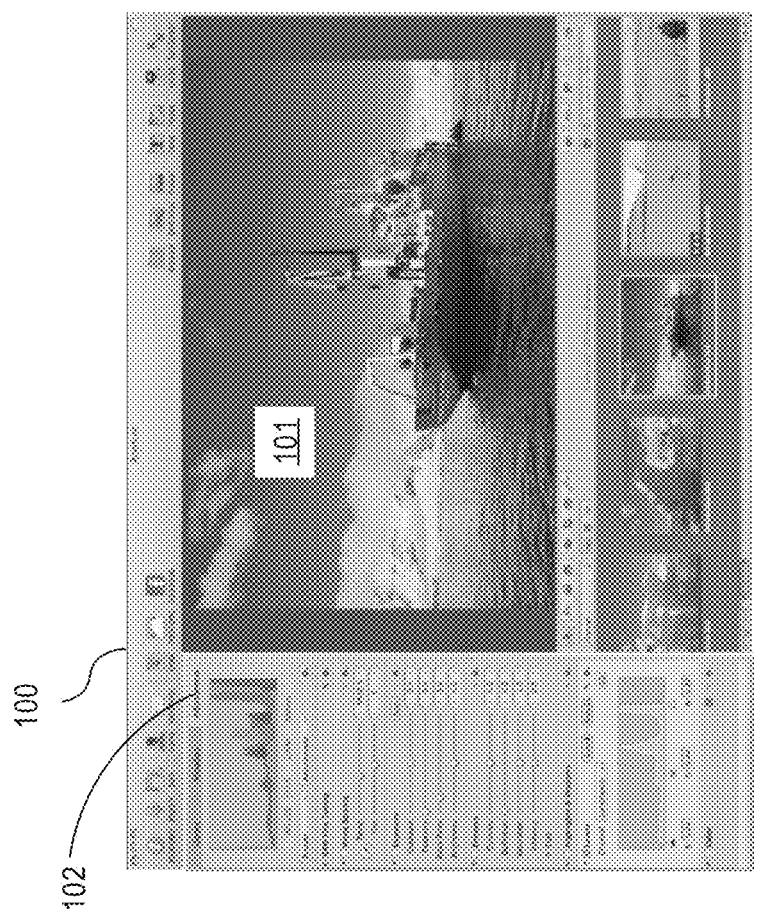
FIGS. 1A and 1B illustrate exemplary user interfaces for an image editing application in accordance with some embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will also be understood that, although the terms first, second, etc. may be used herein to describe various elements, these elements should be limited by these terms. These terms are only used to distinguish one element from another. For example, a first input could be termed a second input and, similarly, a second input could be termed a first input, without departing from the scope of the present invention. The first input and the second input are both inputs, but they are not the same input unless otherwise clearly indicated.

The terminology used herein is for the purpose of describing particular embodiments only and is not intended to be limiting of the invention. As used herein, the singular forms "a", "an", and "the" are intended to include the plural forms as well, unless the context clearly indicates otherwise. Use of "criteria" may indicate either or both of the singular usage of the term, "criterion", or the plural form "criteria", or vice versa.

It will also be understood that the term "and/or" as used herein refers to and encompasses any and all possible combinations of one or more of the associated listed items. It will be further understood that the terms "comprises" and/or "comprising", when used herein, specify the presence of stated features, integers, steps, operations, elements, components and/or groups, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Parameter Adjustment Controls

As mentioned above, image editing applications often concurrently display (a) graphical user interface controls for adjusting various parameters of the preview image and (b) a preview image of the digital image undergoing adjustment. The preview image and the controls are displayed concurrently so that the user can see the effect that an adjustment to a parameter has on the preview image as the adjustment is being made or very soon after the adjustment is made.

For clarity, graphical user interface controls for adjusting parameters of the preview image are referred to hereinafter as "parameter adjustment controls" and the parameters that are adjustable by parameter adjustment controls are referred to hereinafter as "image adjustment parameters". Examples of parameter adjustment controls include, but are not limited to, sliders, infinite scrubbers, color wheels, and text fields. Examples of image adjustment parameters include, but are not limited to, exposure, recovery, black point, brightness, contrast, saturation, vibrancy, highlights, shadows, red level, black level, etc.

The digital image undergoing adjustment may be provided to the image editing application in a variety of ways and the present invention is not limited to any particular way of providing the digital image to the image editing application. For example, the image editing application may read the digital image from a file or receive (download) the digital image over a data network. The digital image can be in one of a variety of different standardized image data formats presently developed or developed in the future including, but not limited to, a Graphics Interchange Format (GIF), a Joint Photographic Experts Group (JPEG) format, a JPEG2000 format, a Portable Network Graphics (PNG) format, a PhotoShop Document (PSD) format (8- and 16-bit), a Tagged Image File Format (TIFF) (8- and 16-bit), a Bit MaP (BMP) format, or a Device Independent Bitmap (DIB) format.

Referring now to FIG. 1A, it illustrates an exemplary user interface window 100 of an image editing application concurrently displaying a current preview image 101 of a digital image undergoing adjustment and parameter adjustment controls on an adjustment panel 102. The current preview image 101 is a version of the digital image undergoing adjustment that reflects the current values of the image adjustment parameters as applied to the digital image undergoing adjustment. The current values of the image adjustment parameters are reflected by the current settings of the parameter adjustment controls. The parameter adjustment controls are provided for adjusting the image adjustment parameters of the current preview image 101.

Techniques are described herein for updating the current preview image with a generated blended image. In some embodiments, the current preview image 101 is displayed at a lower resolution than the resolution of the digital image undergoing adjustment. For example, in these embodiments, if the resolution of the digital image undergoing adjustment is such that it is too large to fit entirely on the display screen, the current preview image 101 may be a scaled down version of the digital image undergoing adjustment that fits entirely on the display screen. The techniques described herein for updating the current preview image with a generated blended image can be used to generate a blended image at the higher resolution of the digital image undergoing adjustment which is then scaled down to be displayed as the preview image. Alternatively, the techniques can be used to generate a blended image at the lower resolution.

In some embodiments, the adjustment panel 102 is not part of window 100, but instead floats above window 100 as a separate user interface window. In this case, the floating window may or may not partially obstruct visibility of the preview image 101. In both cases where the adjustment panel 102 is part of window 100 or floats above window 100, the parameter adjustment controls may be displayed concurrently with the preview image 101.

Figure 1B:
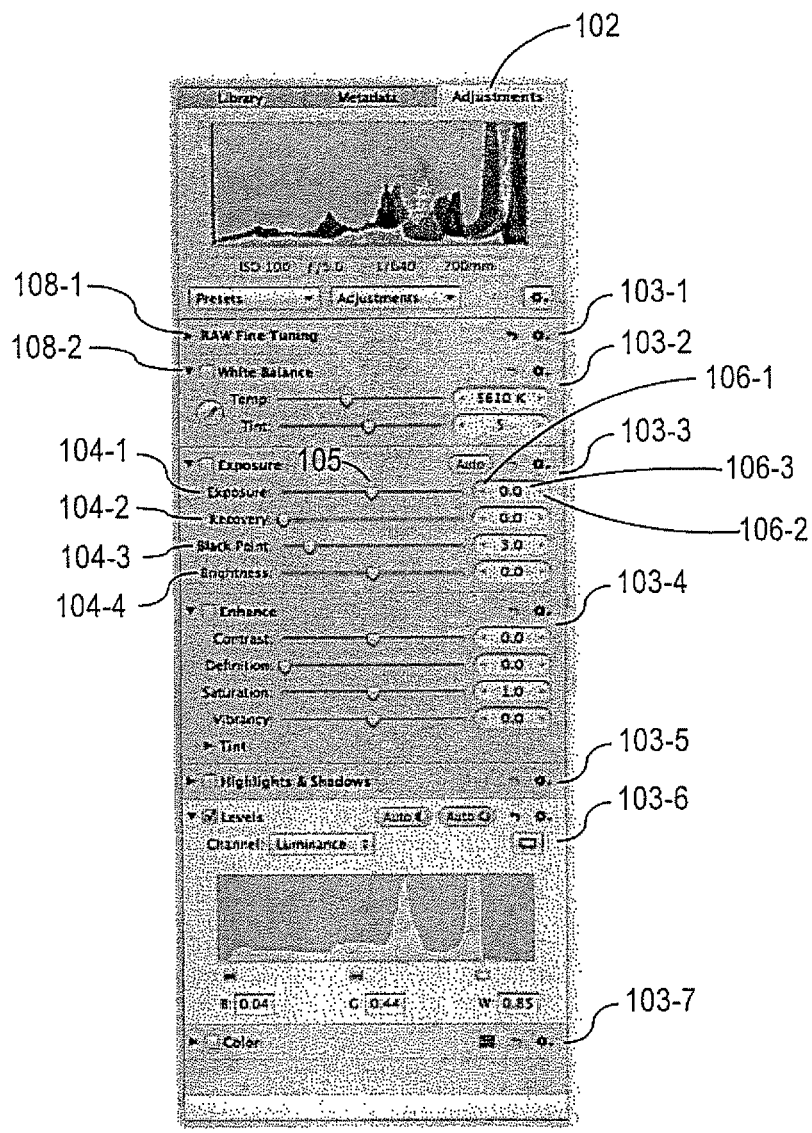

While in FIGS. 1A and 1B, multiple parameter adjustment controls are displayed on a dedicated adjustment panel 102, parameter adjustment controls are displayed otherwise in other embodiments. For example, parameter adjustment controls for a corresponding image adjustment parameter may be displayed in its own dedicated pop-up window or as a transparent overlay to the current preview image 101. Further, not all available parameter adjustment controls corresponding to all available image adjustment parameters may be displayed at the same time and some parameter adjustment controls may not be displayed at the same time as other parameter adjustment controls. More generally, the concurrent display of parameter adjustment controls and preview image 101 shown in FIG. 1A should be taken as merely one example of how parameter adjustments controls might be displayed concurrently with a current preview image of a digital image undergoing adjustment.

According to techniques described herein, the current preview image 101 is updated in response to detecting user input that adjusts parameter adjustment controls corresponding to an image adjustment parameter. More specifically, in response to detecting the user input, a blended image is generated through interpolation from two previously generated images generated by processing a version of the digital image undergoing adjustment through a filter chain. The current preview image 101 is then updated based on the generated blended image.

For clarity, an image generated by processing an image through an image filter chain (i.e., a preconfigured, ordered set of image filters) is referred to hereinafter as a "filtered image" and an image generated through interpolation of two filtered images is referred to herein as a "blended image". Techniques for generating a blended image based on two previously generated filtered images in response to detecting user input that adjusts parameter adjustment controls corresponding to an image adjustment parameter are described in greater detail below. Before that discussion, characteristics of exemplary parameter adjustment controls will now be described.

Characteristics of Exemplary Parameter Adjustment Controls

Referring now to FIG. 1B, it illustrates in greater detail the exemplary adjustments panel 102 concurrently displayed with the preview image 101 in FIG. 1. The panel 102 contains a number of expandable/collapsible sub-panels 103 representing a number of different image adjustments. A sub-panel 103 may expanded or collapsed (hidden) by activating an expand/collapse graphic displayed on the sub-panel 103 with user input (e.g., with a single mouse click or a single tap finger gesture on a touch sensitive surface). For example, the RAW Fine Tuning sub-panel 103-1 may be expanded by activating arrow graphic 108-1 and the White Balance sub-panel 103-2 may be collapsed (hidden) by activating arrow graphic 108-2.

Each sub-panel 103 includes one or more individual parameter adjustment controls corresponding to a number of individual image adjustment parameters. For example, sub-panel 103-3 represents an exposure adjustment and has four individual parameter adjustment controls 104 controlling four individual image adjustment parameters respectively. In particular, user interface controls 104-1 control an exposure parameter, user interface controls 104-2 control a recovery parameter, user interface controls 104-3 control a black point parameter, and user interface controls 104-4 control a brightness parameter.

Parameter adjustment controls for controlling an image adjustment parameter may correspond to a range of possible values of that parameter. For example, parameter adjustment controls 104-1 may correspond to a numerical range from −9.99 (lowest exposure) to +9.99 (highest exposure). The range may be continuous or discrete. The range may also by asymmetrical relative to a neutral or "home" value of the parameter to reflect greater adjustable precision of the parameter in lighter or darker images. For example, the possible values for a black point parameter may range from −5 to 50 where 0 is the neutral or "home" value.

A user may direct input to parameter adjustment controls for an image adjustment parameter to select a value in the range of possible values of the image adjustment parameter. The user input may be pointing device based, touch-based, and/or keyboard based. Exemplary pointing device input includes single-clicking, double-clicking, and clicking and dragging a mouse when the pointing device cursor is displayed on or near the parameter adjustments controls. Exemplary touch-based input includes a single-tap finger gesture, a double-tap finger gestures, and a press and drag finger gesture at a location on a touch-sensitive surface corresponding to the display location of the parameter adjustment controls on the display screen. Exemplary keyboard based input includes striking one or more keys of the keyboard when a text field control of the parameter adjustments controls has the current keyboard input focus.

Parameter adjustment controls for controlling an image adjustment parameter may provide multiple controls for changing the value of the image adjustment parameter. For example, each of the user interface controls 104 provides three different controls for changing the value of the corresponding image adjustment parameter. First, the user can move (e.g., with a click and drag of a mouse or a press and drag of a finger on a touch-sensitive surface) a slider control along a slider track to either increase or decrease the value of the image adjustment parameter. For example, user interface controls 104-1 includes slider control 105 which can be slid (dragged) to the right to increase the value of the exposure parameter or slid (dragged) to the left to decrease the value of the exposure parameter. User interface controls 104-1 also includes infinite scrubber 106. The left arrow 106-1 of the infinite scrubber 106 can be activated (e.g., with a single click of a mouse or a single tap of a finger on a touch-sensitive surface) to decrease the value of the exposure parameter by a predetermined decrement (e.g., by a predetermined fixed or percentage decrement) and the right arrow 106-2 of the infinite scrubber 106 can be similarly activated to increase (e.g., by a predetermined fixed or percentage increment) the value of the exposure parameter. The infinite scrubber 106 also includes a text entry field 106-3 for entering a value for the exposure parameter (e.g., using a keyboard).

While in some embodiments, parameter adjustment controls include slider controls and/or infinite scrubber controls, the parameter adjustment controls include other user interface controls in other embodiments. For example, the other user interface controls could include color wheels, checkboxes, drop-down selection lists, selection boxes, and/or any other user interface control for selecting a value in a continuous range of values or a discrete value in a range of discrete values.

Generating Bounding Images

As discussed above, an image editing application may provide a set of parameter adjustment controls for adjusting the values of a corresponding set image adjustment parameters supported by the image editing application. The image adjustment parameters in the set may vary from application to application and the present invention is not limited to any particular set of image adjustment parameters. The set of image adjustment parameters may have current values that are reflected by the current settings of the corresponding set of parameter adjustment controls. For example, the position of a slider control along a slider track may reflect the current value of an image adjustment parameter controlled by that slider.

According to some embodiments, in response to detecting input to parameter adjustment controls that selects a new value for a corresponding image adjustment parameter, a blended image is generated based on two "bounding" images. The bounding images are filtered images that were generated sometime before the user made the input to select the new value. Because the bounding images were generated before the user selected the new parameter value, the overhead associated with generating the bounding images does not cause a delay between (a) the user input that changes the parameter value, and (b) the update to the preview image. In addition, the blending of the bounding images can generally be performed so quickly that the "parameter-value-change-to-preview-update" delay is minimal.

According to one embodiment, the two bounding images are generated by providing to a filter chain the current values for the set of image adjustment parameters for all but one of the image adjustment parameters. For example, assuming that the current values for brightness, contrast and exposure are all 50. Under these circumstances, the parameter values to generate the first bounding image may be brightness=20, contrast=50, exposure=50. The parameter values to generate the second bounding image may be brightness=70, contrast=50, exposure=50.

As illustrated in this example, the parameter values used to generate both bounding images are the current values (e.g. 50) for all parameters except brightness. For the brightness parameter, one bounding image uses a value (20) that is less than the current value (50), while the other bounding image uses a value (70) that is greater than the current value (50). These bounding images may be used when brightness is the image adjustment parameter for which the new value was selected by the user input.

For clarity, the image adjustment parameter (e.g. brightness) for which a new value is selected is referred to hereinafter as the "target" image adjustment parameter. Similarly, the parameter adjustment controls to which the user directed input (e.g. the brightness control) to select the new value for the target image adjustment parameter are referred to hereinafter as the "target" parameter adjustment controls. The other image adjustment parameters in the set of image adjustment parameters whose current values were not changed by the user input (e.g. contrast and exposure) are referred to hereinafter as "unchanged" image adjustment parameters.

As mentioned above, the current values (e.g. 50) are provided to the filter chain for the unchanged image adjustment parameters (e.g. contrast and exposure) when generating each of the two bounding images through a filter chain. Typically, these same values should be the current values of the unchanged image adjustment parameters at the later time, when the new value for the target image adjustment parameter is selected. That is, at time T1 when the boundary images are generated, the current value of contrast is 50 and the current value of exposure is 50. At the later time T2 when the brightness control is adjusted, the current value of contrast would typically still be 50, and the current value of exposure would typically still be 50.

However, note that since the two bounding images are generated at time T1 (sometime before the user input selecting the new value for the target image adjustment parameter is made), it is not possible to know what the current values of the unadjusted image adjustment parameters will be in the future (e.g., at the time T2 when the user input selecting the new value for the target image adjustment parameter is made). Accordingly, in some embodiments, after generating the two bounding images, the two bounding images are cached. Once cached, the bounding images may be used to generate a blended image when the target image adjustment parameter (brightness) is changed. However, if the current value of an unadjusted image adjustment parameter (e.g. contrast or exposure) is subsequently changed after the two bounding images are generated; the two cached bounding images may be deemed invalid for purposes of generating a blended image in response to a subsequent user adjustment to brightness.

Also mentioned above, when generating each of the two bounding images through a filter chain, a different value is provided for the target image adjustment parameter to the filter chain. The different values are two different values in the range of possible values for the target image adjustment parameter. For example, if the target image adjustment parameter is a brightness parameter that ranges from −2.0 to +2.0, the two different values could be −1.0 and +1.0, as just one example.

According to the some embodiments, two previously generated bounding images associated with a target image adjustment parameter and/or target parameter adjustment controls can be used to generate a blended image for updating a current preview image in response to detecting user input selecting a new value for the target image adjustment parameter if:

(1) the current values of the unadjusted image adjustment parameters have not changed since the two bounding images were generated, and (2) the new selected value for the target image adjustment parameter falls within the range bounded by the two different values for the target image adjustment parameter that were provided to the filter chain when generating the two bounding images.

Generating Bounding Images Example

The above may be further clarified by an example. Assume an image editing application provides a set of four parameter adjustment controls for a corresponding set of four image adjustment parameters supported by the image editing application. The four image adjustment parameters in this example are exposure, recovery, black point, and brightness. In other embodiments, more, less, or different image adjustment parameters are supported. For example, in one embodiment, an image editing application supports fifty or more image adjustment parameters.

It should be noted that an image editing application may support parameters of an image that are not directly adjustable by parameter adjustment controls but the values of which are provided as input to the filter chain. These values may be fixed values, values derived from values of image adjustment parameters, or values otherwise calculated by the image editing application. Reference in this description to "image adjustment parameter" and "set of image adjustment parameters" refers to image parameters that are adjustable by user input directed to parameter adjustment controls and the values of which may be provided as input to the filter chain.

Returning again to the current example, the four image adjustment parameters may have the exemplary ranges listed in Table 1 below. In addition, at a first time, the four image adjustment parameters may have the exemplary current values listed in Table 1 below. The current values at the first time may be reflected in the user interface of the image editing application by the current settings of the four parameter adjustment controls at the first time.

TABLE 1

Exemplary ranges and current values.

| Image Adjustment Parameter | Possible Range of Image Adjustment Parameter | Exemplary Current Value at First Time |
|---|---|---|
| Exposure | −9.99 to +9.99 | 1.2 |
| Recovery | 0.0 to +1.5 | 0.5 |
| Black Point | −5.0 to 50.0 | 3.0 |
| Brightness | −2.0 to 2.0 | −1.3 |

In the example, currently displayed at the first time with the one or more four parameter adjustment controls corresponding to the above-four image adjustment parameters is a current preview image that reflects the current values of the four image adjustment parameters at the first time. The current preview image displayed at the first time can be a blended image or a bounding image.

Continuing the example, assume, also at the first time, two bounding images $FI_1$ and $FI_2$ are generated by the image editing application through a filter chain. Further assume the two bounding images are generated by providing the respective input values to the filter chain for the four image adjustment parameters as shown in Table 2 below.

TABLE 2

Exemplary input values to the filter chain.

| Bounding image | Image Adjustment Parameter | Input Value to Filter Chain |
|---|---|---|
| $FI_1$ | Exposure | 1.2 |
| | Recovery | 0.5 |
| | Black Point | 1.0 |
| | Brightness | −1.3 |
| $FI_2$ | Exposure | 1.2 |
| | Recovery | 0.5 |
| | Black Point | 5.0 |
| | Brightness | −1.3 |

According to Table 2, the only difference when generating bounding image $FI_1$ through the filter chain and when generating bounding image $FI_2$ through the filter chain is the input value for the black point image adjustment parameter to the filter chain. In particular, when generating bounding image $FI_1$ through the filter chain, a value of 1.0 is input for the black point image adjustment parameter. On the other hand, when bounding image $FI_2$ is generated through the filter chain, a value of 5.0 is input for black point image adjustment parameter.

Also according to Table 2, the input values for the other three image adjustment parameters were the same when generating each of the two bounding images $FI_1$ and $FI_2$ through the filter chain. The two bounding images $FI_1$ and $FI_2$ may be associated with the black point image adjustment parameter for use in generating a blended image at a later time if and when the next change to an image adjustment parameter is to the black point image adjustment parameter at a value between 1.0 and 5.0. Associating the bounding images $FI_1$ and $FI_2$ with the black point image adjustment parameter may include storing the bounding images $FI_1$ and $FI_2$ in a volatile or non-volatile computer memory such that they are keyed, hashed, and/or indexed by an identifier of the black point image adjustment parameter.

In some embodiments, instead of keying, hashing, and/or indexing by an identifier of just a single image adjustment parameter, generated bounding images are keyed, hashed, and/or indexed by a composite of all of the identifiers of the image adjustment parameters on which generation of the bounding images was based. For example, instead of keying, hashing, and/or indexing bounding image $FI_1$ based on an identifier of the black point image adjustment parameter, bounding image $FI_1$ is keyed, hashed, and/or indexed by a composite of identifiers for the recovery, exposure, black point, and brightness parameters.

Continuing the example, if, after the first time, the current value of the exposure, recovery, or brightness image adjustment parameters is changed from its current value, then bounding images $FI_1$ and $FI_2$ may be disassociated (e.g., deleted) with the black point image adjustment parameter and/or the parameter adjustment controls for controlling the black point image adjustment parameter. This dissociation may be made because the bounding images $FI_1$ and $FI_2$ no longer reflect the current values of the other three image adjustment parameters.

On the other hand, if, after the first time, the current value of the black point image adjustment parameter is changed to a new value between 1.0 and 5.0 before the current value of the exposure, recovery, or brightness image adjustment parameters is changed, then the previously generated bounding images $FI_1$ and $FI_2$ can be used to generate a blended image that reflects the current values of the four image adjustment parameters.

With this example in mind, examples of generating a bounding image through a filter chain will now be described. Thereafter, strategies for deciding when to generate bounding images for use in generating a blended image in response to a change to an image adjustment parameter are described.

Filter Chain Example

Figure 2A:
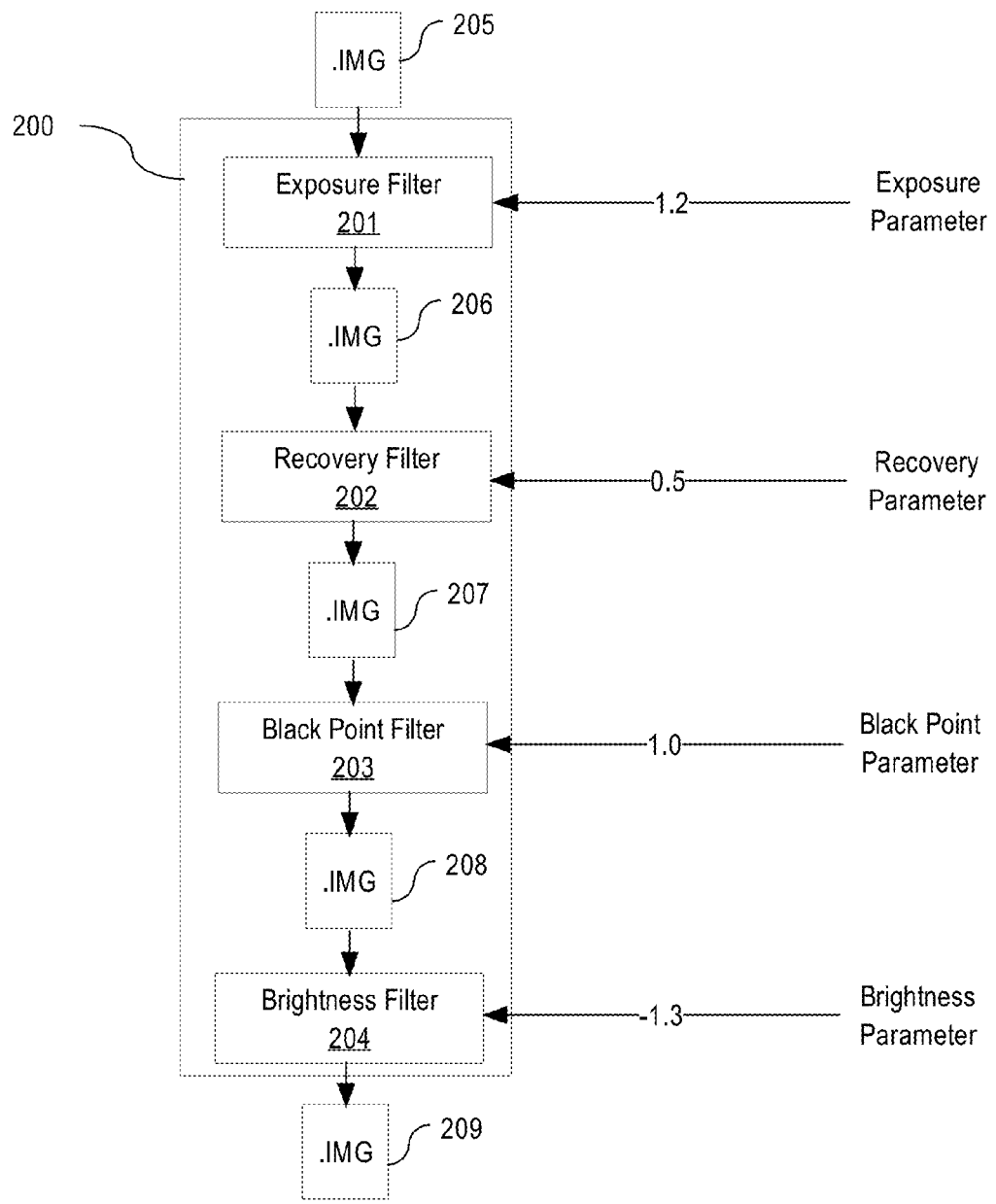
FIGS. 2A and 2B are block diagrams of exemplary filter chains in accordance with some embodiments.

FIG. 2A illustrates an example of using a filter chain 200 to generate the bounding image $FI_1$ (image 209 in FIG. 2A) discussed in the example above. The filter chain 200 has four filters 201, 202, 203, and 204 arranged in an order. Filter 201 is the first filter in the order, 202 the second, 203 the third, and 204 the fourth. In other embodiments, the filter chain 200 includes more, less, or different filters than is shown in FIG. 2A, or includes the four filters in a different order than is shown in FIG. 2A. For example, the filter chain may include relatively more computationally intensive spatial filters such as sharpeners, blurs, etc. in addition to or instead of the exposure, brightness, black point, or recovery filters.

In this example, the four filters 201-204 correspond one-to-one to four image adjustment parameters. However, in other embodiments, one filter may correspond to multiple image adjustment parameters. That is, the filter has more than one image adjustment parameter. In these embodiments, the number of filters in the filter chain may be less than the number of image adjustment parameters. A filter chain may also have filters that do not accept any image adjustment parameters. Thus, it is also possible for a filter chain to have more filters than image adjustment parameters. In addition, a filter may have an input parameter that is not an image adjustment parameter. In other words, a filter may have an input parameter that is not directly controlled by parameter adjustment controls. Thus, filter chain 200 should be understood as one example of a possible filter chain and not limiting as to the types of filter chains compatible with the present invention.

Returning to the current example, a version 205 of the digital image undergoing adjustment is input to the filter chain 200. For example, the input image 205 may be the current preview image, an unadjusted version of the image undergoing adjustment, or a partially adjusted version of the image undergoing adjustment. The output of the filter chain 200 is the bounding image $FI_1$ 209.

The exposure filter 201 receives the input image 205 and the value 1.2 for the exposure image adjustment parameter and produces image 206 as output. The exposure filter 201 modifies the input image 205 according the input value 1.2 for the exposure image adjustment parameter to produce image 206 as output.

In turn, image 206 output by the exposure filter 201 is input to the recovery filter 202. The value 0.5 for the recovery image adjustment parameter is also input to the recovery filter 202. The recovery filter 202 modifies the input image 206 according to the input value 0.5 for the recovery image adjustment parameter to produce image 207 as output.

Next in turn, image 207 output by the recovery filter 202 is input to the black point filter 203. The value 1.0 for the black point image adjustment parameter is also input to the black point filter 203. The black point filter 203 modifies the input image 207 according to the input value 1.0 for the black point image adjustment parameter to produce image 208 as output.

Next in turn, image 208 output by the black point filter 203 is input to the brightness filter 204. The value -1.3 for the brightness image adjustment parameter is also input to the brightness filter 204. The brightness filter 204 modifies the input image 208 according to the input value -1.3 for the brightness image adjustment parameter to produce bounding image $FI_1$ 209 as output.

Figure 2B:
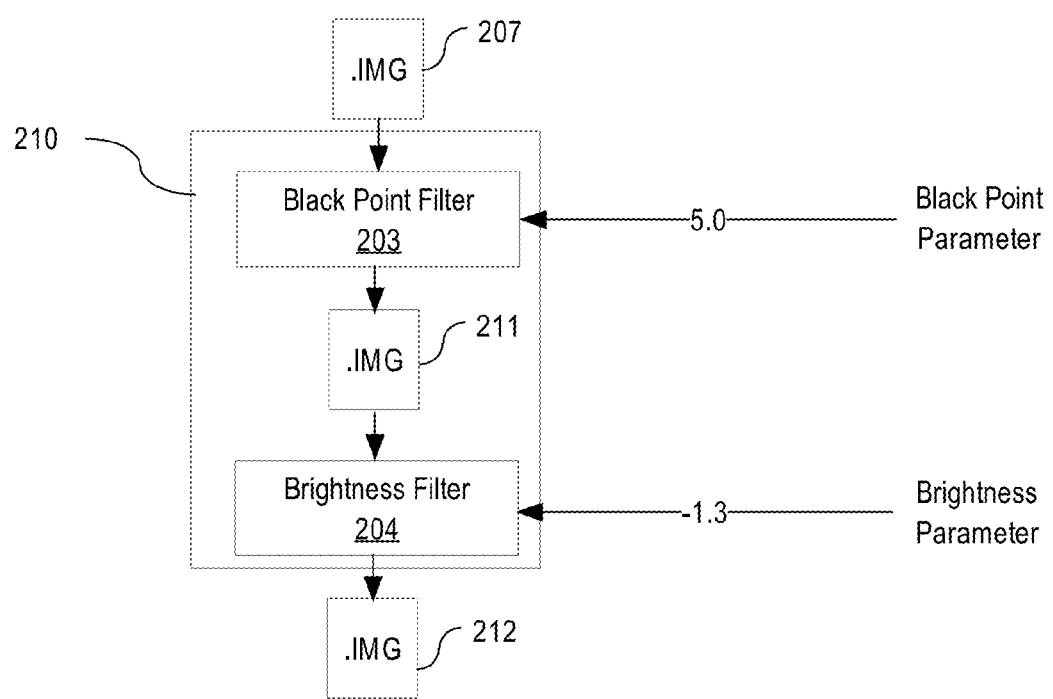

Turning now to FIG. 2B, it illustrates an example of using a filter chain 210 to generate the bounding image $FI_2$ (image 212 in FIG. 2B) discussed in the above-example. Here, the image 207 produced by the recovery filter 202 when generating bounding image $FI_1$ 209 can be reused by the filter chain 210 when generating bounding image $FI_2$ 212, thereby avoiding having to process images through the exposure and recovery filters when generating bounding image $FI_2$ 212. The image 207 can be reused because only the value of the black point image adjustment parameter is different between the two bounding images $FI_1$ and $FI_2$. Recognizing this, when generating second and subsequent bounding images through a filter chain in which only the same one image adjustment parameter is different for the bounding images, the filters earlier (upstream) in the order of the filter chain than the filter having the same one parameter can be skipped by reusing the image output by the immediately preceding filter in the chain generated for the first bounding image.

In the example of FIG. 2B, the black point filter 203 receives as input the image 207 output by recovery filter 202 for the bounding image $FI_1$ 209. The black point filter 203 also receives as input the value 5.0 for the black point image adjustment parameter and produces image 211 as output. The black point filter 203 modifies the input image 207 according the input value 5.0 for the black point image adjustment parameter to produce image 211 as output. Note that image 211 output by the black point filter 203 for the bounding image $FI_2$ 212 differs from image 208 output by the black point filter 203 for the bounding image $FI_1$ 209 because of the different values for the black point image adjustment parameter for the two bounding images $FI_1$ 209 and $FI_2$ 212.

In turn, image 211 output by the black point filter 203 is input to the brightness filter 204. The value -1.3 for the brightness image adjustment parameter is also input to the brightness filter 204. The brightness filter 204 modifies the input image 211 according to the input value -1.3 for the brightness image adjustment parameter to produce bounding image $FI_2$ 212 as output. Note that the bounding image $FI_2$ 212 differs from the bounding image $FI_1$ 209 because of the different values for the black point image adjustment parameter for the two bounding images $FI_1$ 209 and $FI_2$ 212 even though the values for the brightness image adjustment parameter did not differ for the two bounding images.

The above is just one example of generating bounding image through a filter chain and embodiments of the invention are not limited to the particulars of this example for generating bounding images. For example, it is not a requirement that second and subsequent bounding images be generated by skipping earlier (upstream) filters as is done in this example.

When to Generate Bounding Images for an Image Adjustment Parameter

The foregoing provides examples of how to generate bounding images for a target image adjustment parameter using a filter chain. As discussed above, each of the bounding images generated for the target image adjustment parameter may vary with respect to only the value of that target image adjustment parameter. The values of the other image adjustment parameters in the set of image adjustment parameters supported by the image editing application may be held constant when generating each of the bounding images. The values of the other image adjustment parameters may be the current values of those parameters at the time the bounding images are generated. So long as those values remain the current values of the other image adjustment parameters until the target image adjustment parameter is changed by the user, the generated bounding images can be used to update the preview image in response to detecting a change to the target image adjustment parameter. However, if one of the other image adjustment parameters is changed after the bounding images are generated for the target image adjustment parameter but before the target image adjustment parameter is changed, then the generated bounding images may not be useful for updating the preview image in response to detecting a change to the target image adjustment parameter.

Accordingly, in some embodiments, bounding images are generated for an image adjustment parameter in response to detecting input by the user that indicates an intent to change the image adjustment parameter but that does not actually cause the image adjustment parameter to change. By doing so, the bounding images can be generated in sufficient time before the user actually changes the image adjustment parameter with user input. In addition, the probability that the generated bounding images are useful for updating the preview image is increased and the probability that computing resources are wasted generating and storing unused bounding images is decreased.

Generating Bounding Images Based on Pointing Device Cursor Movement

In some embodiments, bounding images are generated for a target image adjustment parameter in response to user input that indicates a likelihood that the user is about to adjust the parameter value. For example, two bounding images may be generated for "brightness" in response to detecting user input that indicates a likelihood that the user is about to adjust the brightness setting.

User input that indicates a likelihood that the user is going to adjust a parameter value may take many forms. For example, such user input may be movement of a pointing device cursor into an area of the graphical user interface of the image editing application in the vicinity of parameter adjustment controls for controlling the value of the target image adjustment parameter. Such detection may be made by listening for pointing device movement events generated by an operating system that indicate that the user is about to interact with the parameter adjustment controls. In response to detecting such a pointing device movement event in the vicinity of the brightness control, the image editing application may generate one or more bounding images for the brightness parameter.

As explained above, the bounding images for brightness are based on (a) the current values of the image adjustment parameters, other than brightness, supported by the image editing application and (b) one or more different values for brightness (the target image adjustment parameter). Example strategies for selecting the different values for the target image adjustment parameter are described in greater detail below.

Some exemplary detected movements of the pointing device cursor that may trigger generation of bounding images for the target image adjustment parameter include detecting the pointing device cursor approaching parameter adjustment controls (e.g., a slider control) for controlling the target image adjustment parameter and detecting the pointing device cursor hovering over parameter adjustment controls (e.g., a infinite scrubber) for controlling the target image adjustment parameter.

Generating Bounding Images Based on User Interface Selection Hints

In some embodiments, bounding images are generated for a target image adjustment parameter in response to detecting a selection of a user interface element that likely precedes user input to parameter adjustment controls for controlling the target image adjustment parameter. Such selections may referred to as user interface selection "hints" that parameter adjustment controls for controlling the target image adjustment parameter are about to be changed by the user. Such hints may include detecting when the user selects an expand panel user interface element for revealing a user interface panel on which parameter adjustment controls for controlling a target image adjustment parameter are displayed (e.g., user interface element 108-1 of FIG. 1B) or detecting when the user selects a drop-down list element that reveals a pop-up dialog on which parameter adjustment controls for controlling a target image adjustment parameter are displayed.

Generating Bounding Images at Other Times

While in some embodiments bounding images are generated for an image adjustment parameter in response to detecting input by the user that indicates an intent to change the image adjustment parameter but that does not actually cause the image adjustment parameter to change, bounding images are generated for an image adjustment parameter at other times in other embodiments.

For example, a new bounding image may be generated when the user moves a control to a position that is within a threshold distance of the setting that is associated with one of the bounding images. For example, assume that the bounding images for brightness include a first bounding image with brightness=−0.5, and a second bounding image with brightness=0.5. While the user moves the control from the setting 0 towards the setting −0.5, the preview image is repeatedly updated based on a blend of bounding images. However, as the control gets within a threshold distance of the setting −0.5, another bounding image may be generated. The bounding image generated under these circumstances would be associated with a brightness value that is below −0.5. For example, the new bounding image may be associated with brightness=−1. Thus, as the user moves the control past the −0.5 setting, the new bounding image (with brightness=−1) may be used to generate a blended image to be used as the preview image.

As another example, bounding images may be generated for one or more commonly adjusted image adjustment parameters when the image editing application is launched by the user. The commonly adjusted image adjustment parameters may be predetermined or determined based on a recorded history of previous image adjustments.

As another example, a new bounding image may be generated for a control when the user adjusts a related control. For example, brightness and exposure may be considered to be related image adjustment parameters in the sense that when the user adjusts one of them, there is a significant likelihood that the user will adjust the other of them next (e.g., based on a recorded history of previous user adjustments or based on the nature of the parameters). Accordingly, when the user adjusts the control for brightness, a new bounding image may be generated for exposure. Similarly, when the user adjusts the control for exposure, a new bounding image or images may be generated for brightness. The generation of the bounding images may be based on the current setting of the related parameter and the new setting of the adjusted parameter. For example, assume the current setting of the brightness parameter=0.1 and the current setting of the exposure parameter is =0.3. If the user adjusts the exposure parameter from 0.3 to 0.5, then a bounding image or bounding images may be generated for the brightness parameter based on the current setting of the brightness parameter 0.1 and the new setting of the exposure parameter 0.5. For example, a first bounding image with a brightness of 0.1−X and an exposure of 0.5 may be generated and a second bounding image with a brightness of 0.1+Y and an exposure of 0.5 may be generated. The values of X and Y can be equal or different.

Selecting Values for the Target Image Adjustment Parameter when Generating Bounding Images When generating a bounding image for a target image adjustment parameter, a value for the target image adjustment parameter is selected for input to the filter chain. The value may be selected based on a variety of factors including, but not limited to, the current value of the target image adjustment parameter, the current values of the other image adjustment parameters, characteristics of the filter that accepts a value for the target image adjustment parameter as input, and the type of parameter adjustment controls. Generally, a value for the target image adjustment parameter should be selected to maximize the probability that when the user changes the current value of the target image adjustment parameter, a blended image can be generated by interpolation of two bounding images that closely approximates the preview image that would have been generated through a filter chain providing the new current value for the target image adjustment parameter as input to the filter chain.

One possible strategy is to select a value for the target image adjustment parameter that is at one end of the range of possible values for the target image adjustment parameter. For example, if the target image adjustment parameter ranges from −9.99 to +9.99, the value −9.99 or the value +9.99 may be selected when generating the bounding image. This "range endpoint" strategy can be effective when two bounding images are generated, one at each end of the range, because, in this case, a blended image can be interpolated for any value within the full range of possible values for the target image adjustment parameter.

Another possible strategy is to select a value that is near the current value for the target image adjustment parameter on the expectation that the next current value selected by the user will be near the current value (e.g., an incremental increase or an incremental decrease). For example, if the current value for a target image adjustment parameter is X, then two bounding images may be generated, one with a value of X−Y for the target image adjustment parameter and another with a value of X+Z for the target image adjustment parameter. Y and Z may be based on a small percentage of X or a fixed increment. Further, Y and Z may be the same or different. For example, Z may be greater than Y on the expectation that the next current value selected by the user will be an increase. This strategy may be especially effective for target image adjustment parameters controlled by slider controls where the next current value selected by the user is likely to one where the user drags or moves the slider from its current position.

Generating a Blended Image

As discussed above, according to some embodiments, a blended image for use in updating the current preview image may be generated in response to detecting user input that selects a new value for a target image adjustment parameter. In particular, two previously generated bounding images associated with the target image adjustment parameter can be used to generate the blended image for updating the current preview image in response to detecting the user input selecting the new value the target image adjustment parameter if the current values of the unadjusted image adjustment parameters have not changed since the two bounding images were generated, and the new selected value for the target image adjustment parameter falls within the range bounded by the two different values for the target image adjustment parameter that were provided to the filter chain when generating the two bounding images.

Figure 3:
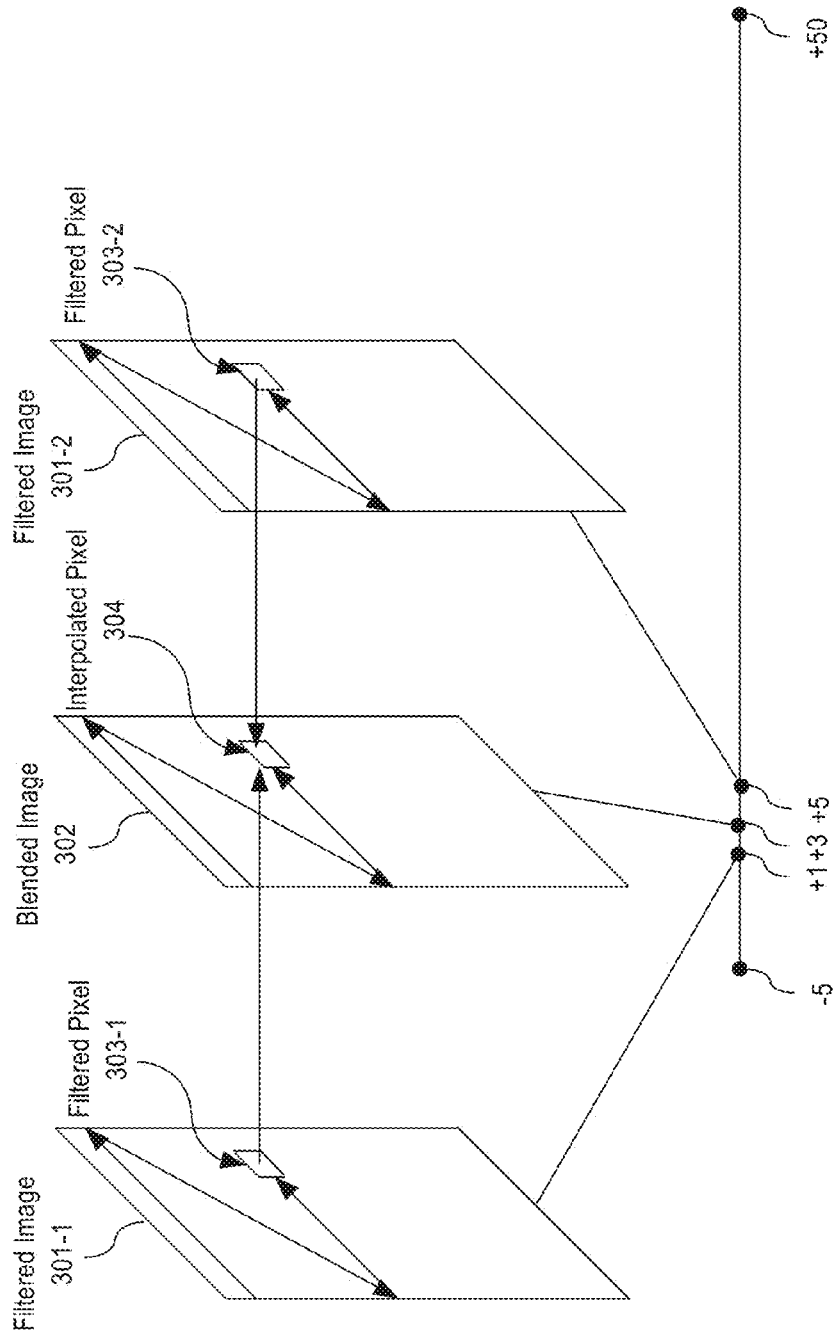
FIG. 3 is a block diagram depicting a blended image generated based on two filtered images in accordance with some embodiments.

Referring now to FIG. 3, it illustrates an example of generating a blended image 302 in response to detecting user input selecting a new value for a target image adjustment parameter from two bounding images 301 that were previously generated for the target image adjustment parameter (i.e., prior to detecting the user input). In this example, the target image adjustment parameter has a range of possible values from −5 to +50. The new value selected for the target image adjustment parameter in this example is +3. The new value (+3) falls between +1 and +5 which is the range bounded by the two different values for the target image adjustment parameter that were provided to the filter chain when generating the bounding images 301-1 and 301-2. In this example, it is assumed that the values for the unadjusted image adjustment parameters have not changed since the bounding images 301-1 and 301-2 were generated.

Note that while in this example only two bounding images were previously generated, more than two bounding images may be generated in other embodiments. Generating more than two bounding images can provide greater interpolation precision when generating a blended image in response to detecting user input that selects a new value for the target input adjustment parameter. In particular, due to the nature of interpolation, a more accurate blended image can be generated through interpolation when the values for the target image adjustment parameter in the bounding images are closer to the new value selected by the user for the target image adjustment parameter. For example, the two bounding images 301-1 and 301-2 with values for the target image adjustment parameter of +1 and +5 respectively would provide a more accurate blended image through interpolation than would two bounding images with values at the endpoints of the target image adjustment parameter's range of possible values. Accordingly, more than two bounding images may be generated for a target image adjustment parameter in order to sub-divide the range of possible values for the target image adjustment parameter into two or more sub-ranges. In a new value for the target image adjustment parameter is selected that falls within one of the sub-ranges, the two bounding images that bound the sub-range may be used for generating a blended image.

It should also be noted that, because of the characteristics of the particular image filter that accepts a value for the target image adjustment parameter as input, it may not be possible to generate a sufficiently representative blended image through interpolation based on a bounding image generated with a value for the target image adjustment parameter that is close to an endpoint value of the range of possible values of the target image adjustment parameter. In this case, the range of possible values of the target image adjustment parameter may be "clamped" to a sub-range and bounding images are generated for only values within the clamped sub-range and blended images are generated only if the new value selected by the user falls within the clamped sub-range. If the user selects a new value for the target image adjustment parameter that is outside the clamped sub-range, then the preview image may be updated by processing a version of the digital image undergoing adjustment through a filter chain with the new value.

Returning to the example of FIG. 3, the blended image 302 is generated by interpolating pixel values based on pixels values of the bounding image 301-1, pixels values of the bounding image 301-2, and the new value for the target image adjustment parameter selected by the user (+3 in this example). In particular, the blended image 302 and the bounding images 301 may each be viewed as a grid in which each cell of the grid contains a pixel value. Initially, cells of the grid for the blended image 302 contain empty pixel values. In some embodiments, the interpolation process proceeds through the grid on a cell-by-cell basis until all cells in the grid have been visited.

In other embodiments, the interpolation process visits only some of the cells in the grid. For example, if the adjustment to the target image adjustment parameter is localized to only a portion of the digital image undergoing adjustment, then only the pixels in that portion of the digital image need to be interpolated. One example of such an adjustment might be a "red-eye" adjustment for removing the appearance of red pupils in a digital photo of a person's face. In this case, the adjustment to the digital image may be only to the portion of the digital image showing the person's eyes. Accordingly, only cells of the grid corresponding to that portion need to be visited during the interpolation process.

Cells of the grid may be visited according to a pattern. One possible pattern as depicted in FIG. 3 is to visit the cells of the grid in a left-to-right top-to-bottom pattern. That is, the cells in the topmost row (or the topmost targeted row if only interpolating a portion) of the grid are visited left-to-right until all cells (or all targeted cells) in that row have been visited, then the cells in the next topmost row (or the next topmost targeted tow) of the grid are visited left-to-right until all cells (or all targeted cells) in that row have been visited, and so on, until all targeted cells have been visited. Other visitation patterns are possible and the present invention is not limited to any particular visitation pattern. For example, the visitation pattern can just as easily be right-to-left top-to-bottom, left-to-right bottom-to-top, or right-to-left bottom-to-top.

When a targeted cell is visited an interpolated pixel value is calculated for the blended image 302 based on the pixel value for the cell from one of the two bounding images 301 and the pixel value for the cell from the other of the two bounding images 301. A pixel value may actually be a combination of multiple values such as red, green, and blue color values or red, green, and blue color values, a chrominance value, and a luminance value.

In the example of FIG. 3, interpolated pixel 304 of the blended image 302 is interpolated from filtered pixel 303-1 of bounding image 301-1 and filtered pixel 303-3 of bounding image 301-2. The interpolation may be linear or non-linear and may be based on the new value selected by the user for the target image adjustment parameter. In particular, the new value selected by the user may determine how close the interpolated pixel value to one or the other filtered pixel values on which the interpolation is based. In the example of FIG. 3, since the new value selected by the user is midway on the range between +1 and +5, the value of interpolated pixel 304 may be equally close to the value of filtered pixel 303-1 and the value of filtered pixel 303-2.

In some embodiments, the current preview image is the blended image 302 such that as the interpolated pixel values for blended image 302 are calculated, the current preview image displayed by the image editing application is updated. For example, the interpolation process may directly update the pixel values of the current preview image stored in computer memory as the interpolation process proceeds (i.e., as the grid is traversed). In other embodiments, the full blended image 302 or a full portion of the blended image 302 is generated separate from the current preview image, and the pixel values of the current preview image are updated based on the separately generated blended image 302.

In some embodiments, instead of interpolating pixel values on a pixel by pixel basis, pixel values of the blended image are interpolated on a tile by tile basis. In particular, the pixels of the filtered images are divided into tiles of adjacent pixels and a tile of pixels of the blended image is generated by interpolating two corresponds tiles, one from each of the filtered images. The titles of the blended image can be generated in any order or in parallel.

Extensions and Alternatives

In some embodiments described above, a blended image is generated based on two pre-generated bounding images. That is, the blended image is generated in response to detecting input that adjusts an image adjustment parameter based on two bounding images that were generated before detecting the input.

In other embodiments, a blended image is generated based on only one pre-generated bounding image. In response to detecting initial input to parameter adjustment controls that adjusts an image adjustment parameter, a second "post-generated" bounding image is generated through a filter chain and a blended image is generated through interpolation based on the pre-generated bounding image and the post-generated bounding image. While generating the post-generated bounding image through the filter chain in response to the initial adjustment may cause a delay updating the preview image noticeable to the user, the post-generated bounding image can be used to generate blended images in response to subsequent input to the parameter adjustment controls. For the subsequent adjustments, the bounding image generated in response to the initial adjustment will have been generated before the subsequent adjustments are detected. Thus, the preview image may be able to be updated for the subsequent adjustments through interpolation of two pre-generated bounding images.

In some embodiments, in response to detecting input that adjusts an image adjustment parameter, a determination is made whether any pre-generated bounding images exist that can be used to generate a blended image. If no such pre-generated bounding images exist, then a bounding image is generated through a filter chain. That bounding image is then used for the preview image. That bounding image is also cached for subsequent adjustments to the image adjustment parameter. For example, if a subsequent adjustment to the image adjustment parameter is detected, then that bounding image may be able to be used as the pre-generated bounding image for generating a blended image as described in the previous paragraph.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
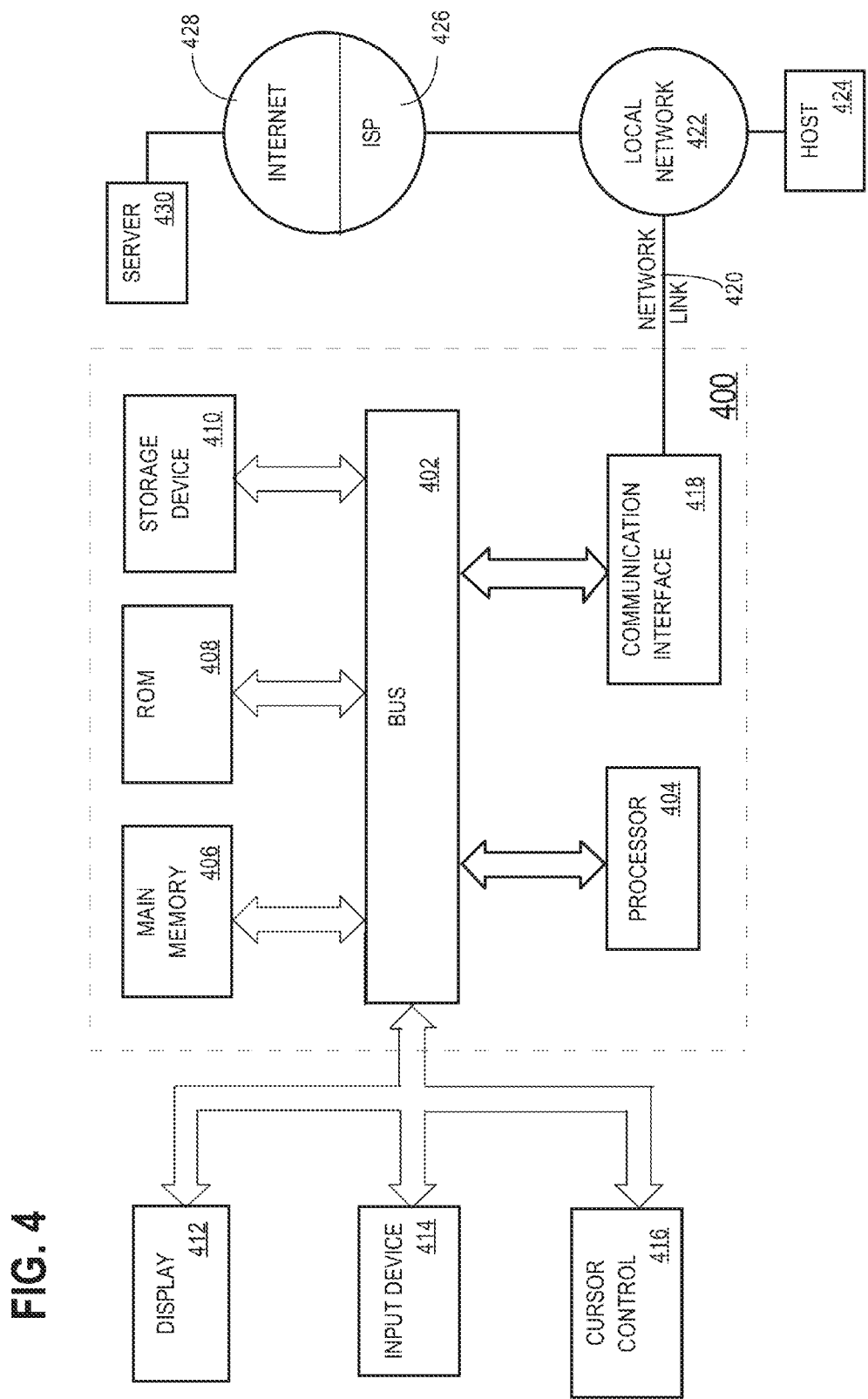
FIG. 4 is a block diagram of a computer system on which embodiments of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A computer-implemented method, comprising:
generating a first version of a digital image and a second version of the digital image;
wherein the first version of the digital image reflects a first plurality of values of a corresponding plurality of image adjustment parameters;
wherein the second version of the digital image reflects a second plurality of values of the corresponding plurality of image adjustment parameters;
wherein the first plurality of values are the same as the second plurality of values except for values that correspond to one particular image adjustment parameter of the plurality of image adjustment parameters;
wherein the value, in the first plurality of values, for the particular image adjustment parameter is a first particular value;
wherein the value, in the second plurality of values, for the particular image adjustment parameter is a second particular value;
wherein the first particular value is different from the second particular value; and
detecting that a user interface control associated with the particular image adjustment parameter is changed to a particular setting that corresponds to a third particular value that is between the first particular value and the second particular value; and
in response to detecting that the control is changed to the particular setting, blending the first version of the digital image and the second version of the digital image to generate and display a blended version of the digital image;
wherein the method is performed by a computing device.

2. The method of claim 1, wherein the blending is based, at least in part, on relative difference between the third particular value and each of the first and second particular values.

3. The method of claim 1, wherein:
generating the first version of the digital image includes processing the digital image through a filter chain; and
generating the second version of the digital image includes processing the digital image through a filter chain.

4. The method of claim 1, wherein generating the first version of the digital image includes selecting the first particular value for the particular image adjustment parameter based on at least one of:
a current value for the particular image adjustment parameter when the first version of the digital image is generated, and
a current value for at least one image adjustment parameter of the plurality of image adjustment parameters other than the particular image adjustment parameter when the first version of the digital image is generated.

5. A computer-implemented method, comprising:
at a computing device with or operatively coupled to a display;
displaying, on the display, user interface controls for specifying a value for a particular image adjustment parameter;
while the user interface controls are at a first setting that corresponds to a first particular value for the particular image adjustment parameter, detecting first user input that:
indicates an intent by a user to change the first setting of the user interface controls, but
does not actually cause the first setting of the user interface controls to change;
in response to detecting the first user input, generating at least a first version of a digital image;
wherein the first version of the digital image reflects a first plurality of values of a corresponding plurality of image adjustment parameters;
wherein the first plurality of values include a second particular value for the particular image adjustment parameter;
wherein the second particular value is different than the first particular value.

6. The method of claim 5, wherein detecting the first user input includes detecting when a pointing device cursor approaches the user interface controls.

7. The method of claim 6, further comprising:
detecting second user input that interacts with the user interface controls to actually change the value of the particular image adjustment parameter value to a third particular value;
in response to detecting the second user input, blending the first version of the digital image and a second version of the digital image to generate and display a blended version of the digital image.

8. The method of claim 7, wherein:
the second version of the digital image reflects a second plurality of values of the corresponding plurality of image adjustment parameters;
the first plurality of values are the same as the second plurality of values except for values that correspond to the particular image adjustment parameter.

9. The method of claim 8, wherein:
the value, of the second plurality of values, that corresponds to the particular adjustment parameter is a fourth particular value; and
the blending is based, at least in part, on relative difference between the third particular value and each of the second and fourth particular values.

10. The method of claim 8, wherein the second version of the digital image is generated in response to detecting the first user input.

11. The method of claim 5, wherein detecting the first user input includes detecting when a pointing device cursor hovers over the user interface controls.

12. A computer-implemented method, comprising:
at a computing device with or operatively coupled to a display;
detecting first user input that interacts with a graphical user interface displayed on the display and that:
indicates an intent by a user to change the first setting of the user interface controls, but does not actually cause the first setting of the user interface controls to change;
in response to detecting the first user input, generating at least a first version of a digital image;
wherein the first version of the digital image reflects a first plurality of values of a corresponding plurality of image adjustment parameters;
wherein the first plurality of values include a second particular value for the particular image adjustment parameter;
wherein the second particular value is different than the first particular value;
wherein the method is performed by a computing device.

13. The method of claim 12, where prior to detecting the first user input, user interface controls for specifying a value for the particular image adjustment parameter are not displayed on the display, the method further comprising:
in response to detecting the first user input, displaying, on the display, user interface controls for specifying a value for the particular image adjustment parameter.

14. The method of claim 13, further comprising:
detecting second user input that interacts with the user interface controls to actually change the value of the particular image adjustment parameter value to a third particular value;
in response to detecting the second user input, blending the first version of the digital image and a second version of the digital image to generate and display a blended version of the digital image.

15. One or more non-transitory computer-readable media storing one or more computer programs which, when executed by a computing device, cause performance of a method comprising the steps of:
generating a first version of a digital image and a second version of the digital image;
wherein the first version of the digital image reflects a first plurality of values of a corresponding plurality of image adjustment parameters;
wherein the second version of the digital image reflects a second plurality of values of the corresponding plurality of image adjustment parameters;
wherein the first plurality of values are the same as the second plurality of values except for values that correspond to one particular image adjustment parameter of the plurality of image adjustment parameters;
wherein the value, in the first plurality of values, for the particular image adjustment parameter is a first particular value;
wherein the value, in the second plurality of values, for the particular image adjustment parameter is a second particular value;
wherein the first particular value is different from the second particular value; and
detecting that a user interface control associated with the particular image adjustment parameter is changed to a particular setting that corresponds to a third particular value that is between the first particular value and the second particular value; and
in response to detecting that the control is changed to the particular setting, blending the first version of the digital image and the second version of the digital image to generate and display a blended version of the digital image.

16. The one or more non-transitory computer-readable media of claim 15, wherein the blending is based, at least in part, on relative difference between the third particular value and each of the first and second particular values.

17. The one or more non-transitory computer-readable media of claim 15, wherein:
generating the first version of the digital image includes processing the digital image through a filter chain; and
generating the second version of the digital image includes processing the digital image through a filter chain.

18. The one or more non-transitory computer-readable media of claim 15, wherein generating the first version of the digital image includes selecting the first particular value for the particular image adjustment parameter based on at least one of:
a current value for the particular image adjustment parameter when the first version of the digital image is generated, and
a current value for at least one image adjustment parameter of the plurality of image adjustment parameters other than the particular image adjustment parameter when the first version of the digital image is generated.

19. One or more non-transitory computer-readable media storing one or more computer programs which, when executed by a computing device with or operatively coupled to a display, cause performance of a method comprising the steps of:
displaying, on the display, user interface controls for specifying a value for a particular image adjustment parameter;
while the user interface controls are at a first setting that corresponds to a first particular value for the particular image adjustment parameter, detecting first user input that:
indicates an intent by a user to change the first setting of the user interface controls, but
does not actually cause the first setting of the user interface controls to change;
in response to detecting the first user input, generating at least a first version of a digital image;
wherein the first version of the digital image reflects a first plurality of values of a corresponding plurality of image adjustment parameters;
wherein the first plurality of values include a second particular value for the particular image adjustment parameter;
wherein the second particular value is different than the first particular value.

20. The one or more non-transitory computer-readable media of claim 19, wherein detecting the first user input includes detecting when a pointing device cursor approaches the user interface controls.

21. The one or more non-transitory computer-readable media of claim 20, the method further comprising:
detecting second user input that interacts with the user interface controls to actually change the value of the particular image adjustment parameter value to a third particular value;
in response to detecting the second user input, blending the first version of the digital image and a second version of the digital image to generate and display a blended version of the digital image.

22. The one or more non-transitory computer-readable media of claim 21, wherein:
the second version of the digital image reflects a second plurality of values of the corresponding plurality of image adjustment parameters;
the first plurality of values are the same as the second plurality of values except for values that correspond to the particular image adjustment parameter.

23. The one or more non-transitory computer-readable media of claim 22, wherein:
- the value, of the second plurality of values, that corresponds to the particular adjustment parameter is a fourth particular value; and
- the blending is based, at least in part, on relative difference between the third particular value and each of the second and fourth particular values.

24. The one or more non-transitory computer-readable media of claim 22, wherein the second version of the digital image is generated in response to detecting the first user input.

25. The one or more non-transitory computer-readable media of claim 19, wherein detecting the first user input includes detecting when a pointing device cursor hovers over the user interface controls.

26. One or more non-transitory computer-readable media storing one or more computer programs which, when executed by a computing device with or operatively coupled to a display, cause performance of a method comprising the steps of:
- detecting first user input that interacts with a graphical user interface displayed on the display and that:
  - indicates an intent by a user to change the first setting of the user interface controls, but
  - does not actually cause the first setting of the user interface controls to change;
- in response to detecting the first user input, generating at least a first version of a digital image;
- wherein the first version of the digital image reflects a first plurality of values of a corresponding plurality of image adjustment parameters;
- wherein the first plurality of values include a second particular value for the particular image adjustment parameter;
- wherein the second particular value is different than the first particular value.

27. The one or more non-transitory computer-readable media of claim 26, where prior to detecting the first user input, user interface controls for specifying a value for the particular image adjustment parameter are not displayed on the display, the method further comprising:
- in response to detecting the first user input, displaying, on the display, user interface controls for specifying a value for the particular image adjustment parameter.

28. The one or more non-transitory computer-readable media of claim 27, the method further comprising:
- detecting second user input that interacts with the user interface controls to actually change the value of the particular image adjustment parameter value to a third particular value;
- in response to detecting the second user input, blending the first version of the digital image and a second version of the digital image to generate and display a blended version of the digital image.

* * * * *